Aug. 1, 1950 A. W. ERNESTUS 2,517,391
JOINT COUPLING
Filed March 6, 1947 2 Sheets-Sheet 2

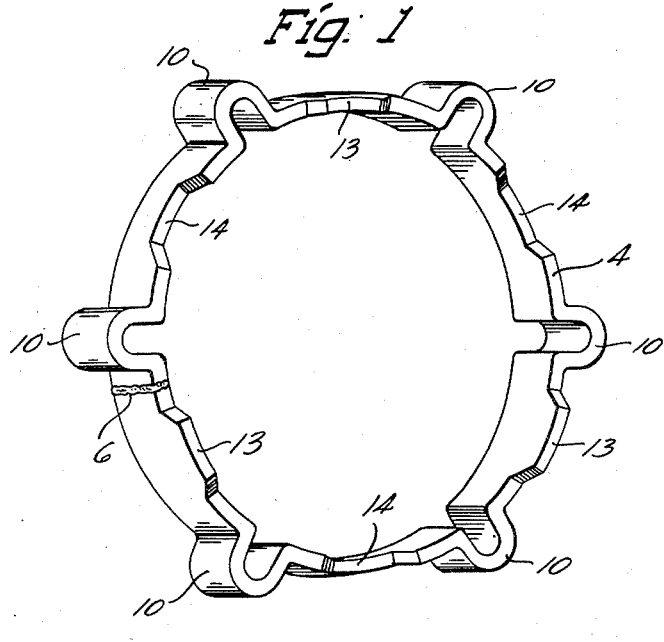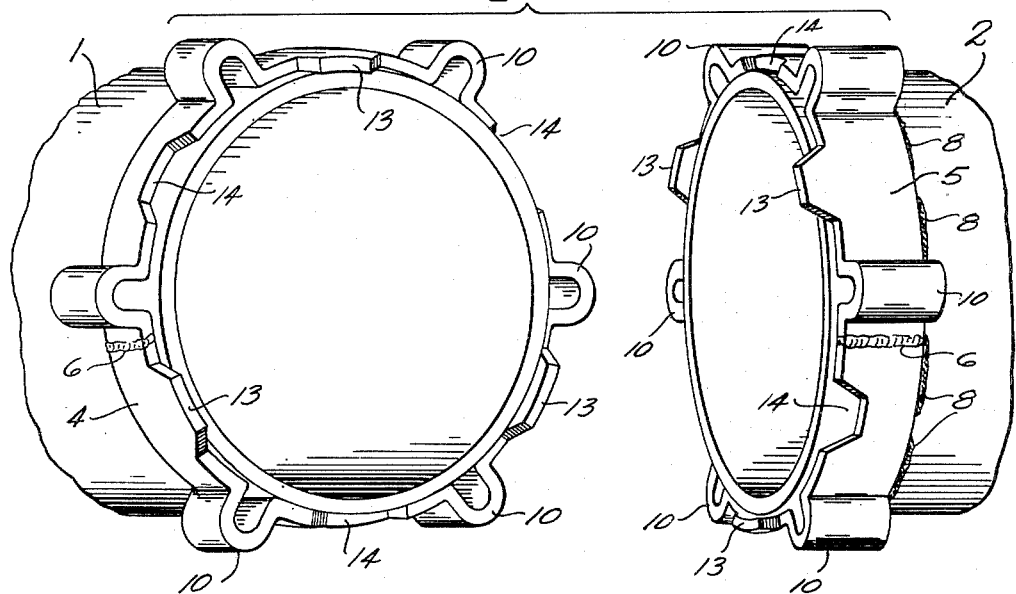

INVENTOR
Adolph W. Ernestus
By
Attorney

Patented Aug. 1, 1950

2,517,391

UNITED STATES PATENT OFFICE 2,517,391

JOINT COUPLING

Adolph W. Ernestus, Milwaukee, Wis., assignor to A. O. Smith Corporation, Milwaukee, Wis., a corporation of New York Application March 6, 1947, Serial No. 732,816

1 Claim. (Cl. 285—137)

This invention relates to joint couplings and particularly has reference to a coupling for joining and sealing together generally large diameter pipe sections.

One object of the invention is to provide a coupling which may be manufactured at a minimum of cost.

Another object of the invention is to provide a lightweight coupling of simple design.

Another object is to provide a coupling of extraordinary strength and ruggedness in service.

Another object is to provide a coupling member which may be stamped to shape from a single piece of flat stock.

Another object is to provide a coupling which can be formed from a single flat strip without waste of metal.

Another object is to provide a coupling which can be readily applied to tubular members of different tolerances.

A further object is to provide a coupling which is indexed against rotation by positively interlocking the parts together.

These and other objects and advantages of the invention will appear hereinafter in connection with the following description of an embodiment of the invention as illustrated in the accompanying drawings.

In the drawings:

Figure 1 is a perspective view of a coupling member before assembly on a pipe;

Fig. 2 is a perspective view of a pair of pipe sections with coupling members secured thereto and with the sections ready for assembly together;

Figure 3:
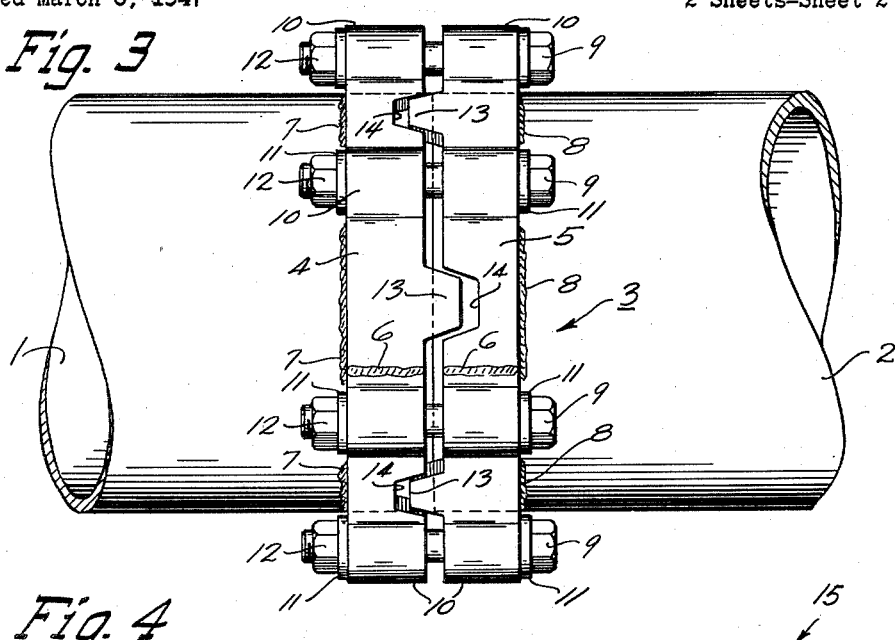
Fig. 3 is an elevational view showing a pair of pipe sections coupled together by the members of the invention.

Referring to the drawings, there is shown the corresponding end portions of the pipes 1 and 2, respectively, which are joined together end to end by the coupling 3.

Coupling 3 in general comprises a pair of complementary members 4 and 5 which are fabricated from sheet metal rolled to generally circular shape and secured at their respective ends by welds 6. Coupling member 4 is secured to the adjacent end of pipe 1 by the circumferentially spaced fillet welds 7 and coupling member 5 is similarly secured to the adjacent end of pipe 2 by welds 8. Welds 7 and 8 extend for a substantial circumferential distance between the folds of the corresponding members 4 and 5 and are located on the far side of members 4 and 5 from the joint between pipes 1 and 2 in order to prevent spatter from entering the joint when the welds are made.

Members 4 and 5 are secured together by the circumferentially spaced longitudinally extending bolts 9 which are assembled therewith as will be described, to hold the faces of the pipes in tight metal to metal contact.

Radial projections 10 are circumferentially spaced about each of coupling members 4 and 5. Projections 10 are provided by looping or corrugating each coupling member longitudinally, as will be described, and the axial opening through each projection or loop which is closed at the inner circumference by the outer surface of the pipe with which the respective coupling member is assembled, is sufficient to receive bolts 9. Projections 10 of one coupling member correspond in number to the projections of the opposite coupling member and the projections are axially aligned upon assembly for insertion of bolts 9 through the openings therethrough.

Suitable washers 11 may be provided between the heads of bolts 9 and the respective coupling member against which they abut as well as between the opposite coupling member and the nuts 12 which are threaded onto the ends of the bolts to secure them in place. The washers are of a size to bridge the axial opening of each projection and insure that the bolts and nuts will be securely seated against the face of each projection.

Each coupling member 4 and 5 is provided with a plurality of circumferentially spaced tabs or tongues 13 as well as a plurality of circumferentially spaced recesses 14. The usual procedure followed is to provide the tabs 13 and recesses 14 alternately on each coupling member and dispose a projection 10 alternately between a tab and recess.

When assembled on the pipe ends, tabs 13 on each coupling member are received in a recess 14 on the other coupling member. The tabs and recesses are formed complementary, as will be described, so that when the tabs 13 are located in the recesses 14 of the opposite coupling member, members 4 and 5 will be positively interlocked together against relative rotational movement. The tabs and recesses are also preferably slightly tapered to allow for tolerance differences between the parts which is particularly important in lining up projections 10 for receiving bolts 9.

The tabs 13 project axially outwardly beyond the ends of pipes 1 and 2 in the assembly of coupling members 4 and 5 on the pipes. When tabs 13 are seated in recesses 14 and the members are interlocked as described, the tabs extend across the pipe joint and constitute an interrupted centering ring that extends circumferentially around the joint. This structure prevents misalignment of the pipes from tendency to separate radially and eliminates shear stresses on bolts 9.

Figure 4:
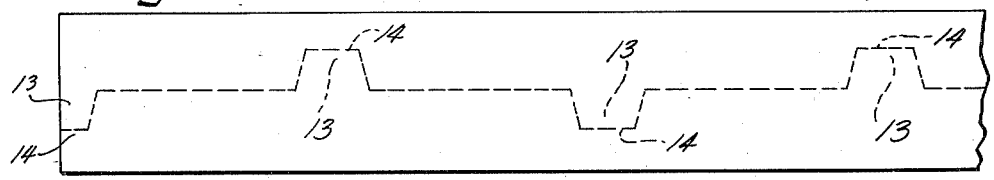
Fig. 4 is a top plan view of a portion of the blank from which the coupling members are cut and showing a dotted shear line.

In fabricating and assembling coupling 3 the flat blank 15 of suitable sheet metal is sheared in half along the irregular dotted lines shown in Fig. 4 to provide in the two halves of the sheared blank the tabs 13 and recesses 14.

Blank 15 is of sufficient length to provide the completed coupling members 4 and 5 of the diameter desired and of a width so that when sheared in half, as described, one half of the blank becomes coupling member 4 and the other half of the blank becomes coupling member 5. This eliminates waste of any of the blank.

Figure 5:
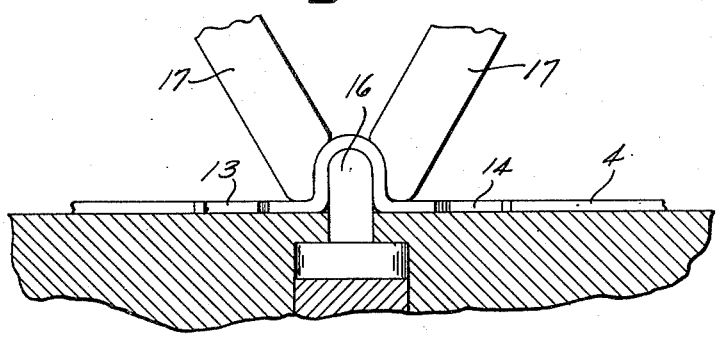
Fig. 5 is a diagrammatic view showing the fabricating of the projections of a coupling member before rolling the same up into a ring member.

The coupling members 4 and 5, as is shown with respect to member 4 in Fig. 5, are then formed with the radial projections 10. This may be done in a number of different ways. In Fig. 5 which illustrates the corrugating or blanking of member 4, the member 4 still in flat shape as cut from blank 15 is supported by mandrel 16 and operated on by the diagonally moving dies 17 to form projection 10 in the surface thereof between one of the tabs 13 and its adjacent recesses 14. The forming of projections 9 may be done simultaneously or one may be formed at a time, as shown. In any event projections 9 are provided along the length of the coupling member 4 in spaced relation and between each tab and recess. The method of locating the recesses, tabs and projections may be varied as they need not be alternated as shown and the number employed is varied with the size of pipe to which the coupling is applied.

After forming as described, the members 4 and 5 are rolled up into generally circular shape and the respective ends of each coupling member are then secured together by the longitudinal welds 6, as shown in Fig. 1.

The end edges of pipes 1 and 2 are machined to insure that the ends of the pipe will be sealed together when coupling 3 is completed.

After fabrication the coupling member 4 is slipped over the end of pipe 1 and secured thereto by fillet welds 7 with the tabs 13 thereof extending axially outwardly from the end of the pipe. Coupling member 5 is similarly assembled on pipe 2 and the tabs 13 of each member are disposed in recesses 14 of the opposite member when the pipes are finally aligned and assembled.

Coupling members 4 and 5 are substantially flexible due to the corrugations or projections 10 so that they can be applied to pipes of different tolerances. Also the taper provided in tabs 13 and recess 14 permits slight adjustments between the coupling members before they are welded in place in proper alignment to receive bolts 9.

The bolts 9 are inserted through the axial openings of projections 10 and nuts 12 are threaded thereon to tighten the coupling with washer 11 being located beneath the heads of bolts 9 and nuts 10.

When nuts 12 are tightened up coupling 3 holds the faces of pipes 1 and 2 tightly together to seal the joint therebetween. The tabs 13 of each member 4 and 5 extend across the joint in contact with the outer circumferential surface of each pipe and prevent misalignment of the pipes under shear stresses in service. The interlocking of the coupling by the tabs and recesses prevents any tendency of one ring member to rotate relative to the other ring member.

The invention provides a joint coupling which can be made from sheet metal at considerably lower cost than a forged or cast coupling.

The coupling members are accurately interlocked together due to the forming of the tabs and recesses simultaneously from a blank.

The providing of the projections outwardly from the blank itself is done in a simple operation and the cantilever beam effect of the projections provides superior strength to withstand the stresses to which they are subjected in service.

In addition, the coupling members are flexible to fit pipes of different tolerances and for ease of assembly.

Various embodiments of the invention may be employed within the scope of the accompanying claim.

I claim:

In a coupling for joining generally large size tubular metal sections axially together end to end, a complementary sheet metal band applied circumferentially of each said section adjacent the end thereof and welded along its outer edge remote from the end edge of the corresponding section and for a substantial circumferential distance to the outer surface of the corresponding section, projecting loops extending radially from said bands in circumferentially spaced relation and constituting means to receive and seat axially extending bolts for securing the bands together to seal the joint between said sections, and a plurality of circumferentially spaced tabs projecting longitudinally axially from each of said bands across the joint between the sections and fitting in complementary recesses in the opposite band to positively interlock the bands together against relative rotation, and said tabs and recesses having complementary longitudinally tapered sides to axially align the projections of one band with the projections of the opposite band by relative circumferential movement within predetermined tolerance limits for insertion through the aligned loops of opposite projections of the bolts securing the bands together.

ADOLPH W. ERNESTUS.

REFERENCES CITED

The following references are of record in the file of this patent:

UNITED STATES PATENTS

| Number | Name | Date |
|---|---|---|
| 1,263,252 | Jencick | Apr. 16, 1918 |
| 1,273,524 | Murray | July 23, 1918 |
| 1,514,052 | Kaiser | Nov. 4, 1924 |
| 1,962,400 | McWane | June 12, 1934 |
| 2,439,161 | Du Bois | Apr. 6, 1948 |